CONDUCTIVE MEDIA FOR ELECTROLUMINESCENT DEVICES, AND ELECTROLUMINESCENT DEVICE
Filed July 8, 1965
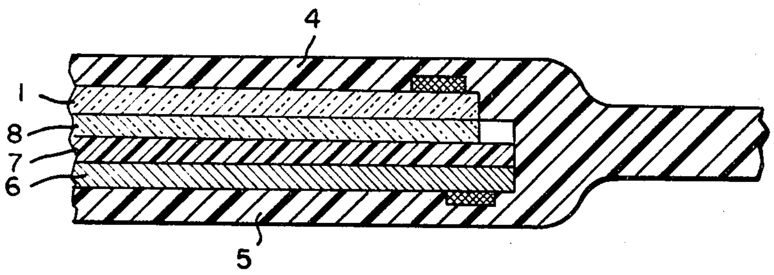
THOMAS J. SENTEMENTES
ERIC L. MAGER
INVENTORS
BY Owen J. Meegan
ATTORNEY United States Patent Office
3,379,915
Patented Apr. 23, 1968

3,379,915

CONDUCTIVE MEDIA FOR ELECTROLUMINESCENT DEVICES, AND ELECTROLUMINESCENT DEVICE

Thomas J. Sentementes, Wakefield, and Eric L. Mager, Beverly, Mass., assignors to Sylvania Electric Products Inc., Beverly, Mass., a corporation of Delaware Filed July 8, 1965, Ser. No. 470,414
1 Claim. (Cl. 313—108)

This invention relates to conductive media for electroluminescent devices and an electroluminescent device made therefrom. Particularly, this invention concerns the use of an indium oxide based material, doped with a metal of a different valence to form an electrically conductive composition. Moreover, this invention relates to electroluminescent lamps, particularly of the flexible type, utilizing the above-described electrically conductive material.

Flexible electroluminescent lamps include two superposed electrodes, one of which is light transmitting and an interposed layer of light emitting material. The base of the posed layer of light emitting material. The base of the lamp is one of the electrodes and is formed of a flexible metal such as aluminum foil. The light transmitting electrode has been a sheet of fibrous glass paper which has been made electrically conductive through impregnation with a solution of indium trifluoroacetate and subsequent oxidation to the corresponding oxide. According to our invention we have discovered that certain indium oxide based compositions can be suspended in a suitable polymeric media and the resulting conductive lacquer coated directly upon the phosphor layer of the lamp as a substitute for the glass paper.

Elimination of the glass paper as one electrode in the device and the substitution of the conductive lacquer materially simplifies the fabrication of electroluminescent lamps. Fibrous glass paper frequently broke or tore while it was being treated with the indium trifluoroacetate or during the lamination operation. Such elimination enables the manufacture of flexible lamps of almost unlimited length.

According to our invention, we form a solid state mixture of indium oxide together with atoms of a metal having an oxidation state different than the oxidation state of the indium. This doping metal can be bivalent, quadrivalent, or pentavalent wherein at least one of the oxidation states of the atoms is in one of the above-described categories. Illustrative of suitable doping metals are tin, cadmium, antimony, bismuth, zinc, arsenic, titanium or mixtures of these metals in suitable doping proportions. We have found that about 0.05 to 0.5 gram atoms of the doping material should be added for each mole of indium oxide in the initial formulation. This material is then mixed in a suitable polymeric suspending media to form a conductive lacquer.

Accordingly, the primary object of our invention is the utilization of conductive lacquers composed of an organic polymeric binder and containing therein a matrix of indium oxide with suitable doping atoms.

A further object of our invention is the utilization of a conductive lacquer formed of an indium oxide base in an electroluminescent lamp.

The many other objects, features and advantages of our invention will become manifest to those conversant with the art upon reading the following specification when taken in conjunction with the accompanying drawings.

Of these drawings:

The figure is a cross section of an electroluminescent device in which the conductive lacquer of our invention is used.

Referring now to the figure, a cross section of our electroluminesment device is illustrated. Each cell is composed of flexible components, generally, but not necessarily, rectangular in shape, laminated together and hermetically sealed within strips of plastic material. The cell may be energized by applying an alternating voltage, for instance 118 volts, 60 cycles A.C. to current conveyors which are disposed along the length of the device and across the hermetic seals between adjacent cells. A lower insulating film or sheet 4 and an upper insulating sheet 5 form, respectively, the underside and the top side of the envelope in the finished device and comprise sheets of thermoplastic material which flow under heat and pressure and weld together along the margins. The material selected must be reasonably tough and stable, in addition to being light transmitting and fairly flexible. Examples of such materials are polyethylene, polytetrafluoroethylene, chlorotrifluoroethylene, polystyrene, methylmethacrylate, vinylidene and vinyl chloride and fluoride polymers. A preferred material is Kel-F film about 0.005 inch thick.

For the cell itself, a rectangular sheet of thin metal foil 6 can serve at the base electrode and can be coated with an insulating layer 7 of high dielectric constant materials. A light-emitting layer 8 including an electroluminescent phosphor is coated upon the base electrode 6 in sufficient thickness to effect electroluminescence upon the application of the varying or alternating current.

For a light-transmitting electrode 1 in the device we have found that a conductive lacquer of doped indium oxide suspended in a suitable polymer can be used. To prevent short circuiting, a small recess of margin must be left around the periphery of the layer of light emitting material 8, so that the electrode 1 does not touch the base electrode 6.

The metal foil 6 may be a dead soft annealed aluminum sheet of 0.008 inch thickness, coated with a thin insulating layer of barium titanate dispersed in an organic polymeric matrix and overcoated with an electroluminescent layer of phosphor such as copper activated zinc sulfide.

Many polymeric matrices, such as cellulose nitrate, polyacrylates, methacrylates, polyvinyl chloride, cellulose acetate, alkyd resins, epoxy cements, and polymeric triallyl-cyanurate, to which may be added modifying substances or plasticizers such as camphor, dioctylphthalate, tricresylphosphate and similar materials may be used to disperse the phosphor and the dielectrics. For a preferred organic matrix forming a dense tough film of high dielectric constant and great mechanical and thermal stability, we may use cyanoethylcellulose such as described and claimed in the copending application of Thomas Sentementes et al. Ser. Number 94,536, filed Mar. 9, 1961, and entitled, "Electroluminescent Devices and an Improved Dielectric Media for Such Electroluminescent Devices" and assigned to the assignee of the present invention. The insulating layer 4 can be formed of barium titanate dispersed in a cyanoethylcellulose solution and may be applied to the aluminum foil by spraying or preferably through the use of a doctor blade and then drying. The phosphor layer, similarly dispersed in a cyanoethylcellulose solution may be applied over the barium titanate layer in the same manner.

As a suitable polymeric suspending media for the doped indium oxide we have found that esters of cellulose nitrate and cellulose acetate; esters of cellulose ethylate, cellulose methylate, cellulose hydroxyethylate, cellulose cyanoethylate; polyamide of polyacrylamide and polyhexamethylene adipamide copolymers; alkyd polyesters, polycarbonates; melamine formaldehyde amino resins; epoxy resins; fluorocarbons such as polyvinylidene fluoride; polyvinyl alcohol; polyurethans; and silicones are suitable. These materials can be coated directly upon the phosphor substrate and lead-in wires attached directly thereto.

In order to operate the electroluminescent cell, an alternating potential must be between the conducting surfaces. Conveniently, a pair of spaced and insulated metal braids or ribbons are individually connected to the respective electrodes. One of the current conveyors extends to touch the conductive lacquer layer 1 and another connects to the aluminum foil layer 6. In addition to copper braids or screens many other suitable current conveyors may be used also. Also, a printed circuit may be readily integrated into electroluminescent devices. There is no criticality concerning the manner in which the current conveyors are secured to the respective conducting layers of the electroluminescent device.

During heat sealing, the copper screens may be embedded in the lower thermal plastic sheet 5 and will in turn attach to the aluminum foil layer 6. The current conveyor extends outside of the electroluminescent seal and can be easily attached to suitable sources of current.

The method of laminating the cell is well known and according to conventional procedures, a vacuum operation is used to purge the laid up components of the cell of gases and at the same time to hold the cell in perfect registry until placed in the laminating press wherein a pneumatic or hydrostatic laminating procedure is used. It is essential however to remove all traces of residual gases and moisture in the cells because they would be detrimental to the efficiency of the device. Where nylon is used, the pressure applied to the lay-up may be approximately 500 lbs. per square inch, and the temperature in the range of 110° C. to 200° C. depending upon the grade of plastic. For instance, a temperature of 150° C. applied for a period of ten minutes is usually sufficient to fuse the plastic. After cooling, the pneumatic pressure and the vacuum are both released and the press is opened. The furnished laminated electroluminescent device is easily removed.

To prepare the conductive lacquer one mole of indium oxide ($In_2O_3$) is mixed with about 0.05 to 0.5 gram atoms of divalent, quadrivalent or pentavalent metals, based upon initial formulations. When much greater than about 0.5 gram atoms of the above-described metals are added to the indium trioxide, the conductivity is decreased and when substantially lesser quantities than about 0.05 gram atoms are used, the conductivity is reduced also. The doped matrix is then rolled in one of the above-described polymeric suspending media and can be coated upon a lamp.

With particular reference to tin, cadmium and antimony doping agents in indium trioxide, the following table is offered.

TABLE I

| Voltage and Frequency | Brightness | Resistivity |
|---|---|---|
| A. 120 v./60 c.p.s. | 4.62 foot lamberts | 25,700 ohms. |
| 75 v./400 c.p.s. | 6.69 foot lamberts | |
| B. 120 v./60 c.p.s. | 4.13 foot lamberts | 62,500 ohms. |
| 75 v./400 c.p.s. | 6.66 foot lamberts | |
| C. 120 v./60 c.p.s. | 4.11 foot lamberts | 72,200 ohms. |
| 75 v./400 c.p.s. | 6.59 foot lamberts | |

Example A of the table is illustrative of a control in which a glass, fibrous paper is immersed in a solution of indium trifluoroacetate and then oxidized. In Examples B and C respectively, tin and cadmium and tin, cadmium and antimony doped indium oxide conductive layers are measured. As is apparent, the brightness of lamps using the latter two transparent electrodes are at least the same as those using conductive glass paper, however, all of the cost and trouble of the latter is eliminated.

As specific examples of our invention, the following methods of preparing the conductive lacquer are offered.

EXAMPLE I

| Mix: | Gm. |
|---|---|
| $In_2O_3$ | 96.4 |
| $SnCl_4.5H_2O$ | 8.5 |
| $CdCl_2$ | 2.3 |

Place the mixture in a covered silica crucible and fire at 1480° F. for one hour. Remove the reaction product from the crucible and roll a mixture as follows:

| | Gm. |
|---|---|
| Reaction product | 30 |
| Polyvinylidene fluoride (18% by weight in dimethylformamide) | 6.85 |
| Dimethylformamide | 20.9 |

Roll the mixture for one hour and the resulting lacquer can be then coated on lamps.

EXAMPLE II

| Mix: | Gm. |
|---|---|
| $In_2O_3$ | 6.00 |
| $SbCl_3$ | 0.10 |
| $SnCl_4.5H_2O$ | 0.85 |
| $CdCl_2$ | 0.14 |

Fire and mix in a polymeric suspending media as discussed in Example I above.

EXAMPLE III

| Mix: | Gm. |
|---|---|
| $In_2O_3$ | 6.00 |
| $SbCl_2$ | 0.10 |
| $SnCl_4.5H_2O$ | 0.85 |
| $CdCl_2$ | 0.14 |
| $ZnCl_2$ | 0.10 |

Fire and mix in a polymeric suspending media as discussed in Example I above.

EXAMPLE IV

| Mix: | Gm. |
|---|---|
| $In_2O_3$ | 6.00 |
| $SbCl_3$ | 0.10 |
| $SnCl_4.5H_2O$ | 0.85 |
| $CdCl_2$ | 0.14 |
| $AlCl_3.6H_2O$ | 0.10 |

Fire and mix in a polymeric suspending media as discussed in Example I above.

It is apparent that modifications and changes can be made within the spirit and scope of the instant invention. But it is our intention, however, only to be limited by the spirit and scope of the appended claim.

As our invention, we claim:

1. An electroluminescent device comprising: an electrically conductive base member; a layer of light emitting material including an electroluminescent phosphor disposed above said base member; an electrically conductive lacquer disposed above said layer of light emitting material, said electrically conductive lacquer including indium oxide doped with a member selected from the group consisting of tin plus cadmium and tin plus cadmium plus antimony, said cadmium being divalent, said dopant being present in quantities of 0.05 to 0.5 gram atoms per mole of indium oxide.

References Cited

UNITED STATES PATENTS

| | | | |
|---|---|---|---|
| 3,027,277 | 3/1962 | Vander Linden | 117—211 |
| 3,295,002 | 12/1966 | Amans | 313—108 |
| 3,315,111 | 4/1967 | Jaffe et al. | 313—108 |

JAMES W. LAWRENCE, *Primary Examiner.*

R. L. JUDD, *Assistant Examiner.*